(12) United States Patent　(10) Patent No.: US 6,242,818 B1
Smedley　(45) Date of Patent: Jun. 5, 2001

(54) VERTICAL AXIS WIND TURBINE

(76) Inventor: Ronald H. Smedley, 160 W. Prospect Ave., Apt. 308, Pittsburgh, PA (US) 15205

( * ) Notice: Subject to any disclaimer, the term of this patent is extended or adjusted under 35 U.S.C. 154(b) by 0 days.

(21) Appl. No.: 09/440,950

(22) Filed: Nov. 16, 1999

(51) Int. Cl.[7] ........................................ F03D 9/00
(52) U.S. Cl. ............................................. 290/44; 290/55
(58) Field of Search ........................ 290/44, 55; 310/156, 310/67; 416/41, 45

(56) References Cited

U.S. PATENT DOCUMENTS

| | | |
|---|---|---|
| 247,266 | 9/1881 | Miller, Jr. . |
| 299,563 | 6/1884 | Martin . |
| 410,361 | 9/1889 | Harbaugh . |
| 591,962 | 10/1897 | Evison . |
| 1,076,713 | 10/1913 | Southwick . |
| 1,586,914 | 6/1926 | Palm . |
| 3,856,432 | 12/1974 | Campagnuolo et al. ............... 416/45 |
| 4,004,861 | 1/1977 | Soules ...................................... 416/41 |
| 4,039,849 * | 8/1977 | Mater et al. ............................. 290/55 |
| 4,061,926 * | 12/1977 | Peed ......................................... 290/55 |
| 4,289,970 * | 9/1981 | Deibert .................................... 290/44 |
| 4,318,019 * | 3/1982 | Teasley et al. ......................... 310/156 |
| 4,520,273 * | 5/1985 | Rowe ....................................... 290/54 |
| 4,692,631 * | 9/1987 | Dahl ......................................... 290/55 |
| 4,776,762 | 10/1988 | Blowers, Sr. .......................... 416/119 |
| 5,051,059 | 9/1991 | Rademacher ............................. 415/7 |
| 5,076,759 | 12/1991 | Schoenell .............................. 416/119 |
| 5,320,491 | 6/1994 | Coleman et al. ....................... 416/24 |
| 5,425,619 | 6/1995 | Aylor ...................................... 416/42 |
| 5,742,107 | 4/1998 | Asao et al. ............................. 310/62 |
| 5,783,894 * | 7/1998 | Wither .................................... 310/266 |

* cited by examiner

*Primary Examiner*—Nicholas Ponomarenko
(74) *Attorney, Agent, or Firm*—David W. Brownlee; David V. Radack; Eckert Seamans Cherin & Mellott, LLC

(57) ABSTRACT

A vertical axis wind turbine having a plurality of blades around its periphery and a pivotable door associated with each blade. Each door has a pivot axis that is inclined outwardly toward the bottom of the turbine so that gravitational forces will pull the doors toward an open position. The doors are designed to move toward a closed position to at least partially block wind forces from the blades when the rotor rotates at potentially damaging speeds. The turbine has mating coils on the rotor and the support column to generate electrical energy when the rotor rotates.

19 Claims, 5 Drawing Sheets

VERTICAL AXIS WIND TURBINE

BACKGROUND OF THE INVENTION

1. Field of the Invention

This invention relates to wind turbines for generating electrical power, particularly to vertical axis wind turbines, and more particularly to such turbines having means for preventing catastrophic failures in high winds.

2. Brief Description of the Prior Art

Wind Turbines provide a source of electrical power as an alternative to fossil fuels to help reduce gaseous emissions and other environmental problems. Wind turbines also provide electrical power in remote areas where power lines have not been strung. Accordingly, numerous wind turbines have been installed in high wind areas in the United States and other countries.

Wind turbines have either horizontal axes or vertical axes of rotation, with each type having different advantages and disadvantages. Vertical axis turbines have, among other advantages, little or no need for a tower on which to mount the turbines. The turbine, gearing electrical generators and the like can generally be mounted at ground level.

Most wind turbines are subject to possible damage from excessively high winds. Vertical axis turbines are less vulnerable to damage from high winds because such turbines are not usually mounted on towers that can be blown over. However, high winds can damage vertical axis turbines by causing them to run at excessively high speeds (RPM), which can cause catastrophic failure of the rotor, gearing, etc.

It is known to provide speed limiters or governors for wind turbines to reduce the risk of damage from high winds and excessively high speed rotation of the turbines. For example, U.S. Pat. No. 5,425,619 to Aglor discloses a horizontal axis turbine having spring-loaded gate flaps which open responsive to predetermined levels of air pressure to spill air through outlets instead of across the air-engaging blades in the turbine. U.S. Pat. No. 3,856,432 discloses a vertical axis turbine having leaves made of resilient material which are unfolded by centrifugal forces at predetermined rotational speeds to interfere with air that would otherwise cause the rotor to speed out of control. U.S. Pat. Nos. 591,962; 1,586,914 and 4,004,861 also disclose systems for controlling the speed of wind turbines.

An improved means is needed for reducing the risk to vertical axis wind turbines from high winds.

A low cost, reliable wind turbine is desired which includes means for reducing the possible risk of excessively high speed operation.

A vertical axis wind turbine is needed that will not destroy itself in high winds.

A wind turbine is also desired that is economical to manufacture.

SUMMARY OF THE INVENTION

This invention satisfies all the above needs for an improved wind turbine. The invention provides a vertical axis wind turbine having a means for automatically maintaining the turbine speed or possibly shutting the turbine down if its rotational speed reaches a predetermined RPM in excessively high winds. This invention also provides a wind turbine that includes electrical power generating means inside the turbine.

This invention has a rotor with a plurality of blades on the rotor and a pivotable door associated with each blade to block or partially block the wind from the blade when the rotor rotates at potentially damaging speeds. The pivot axis for each door is inclined outwardly with respect to the vertical axis of the turbine from the top to the bottom of the turbine so gravitational forces on the door pulls it to an open position that permits the wind to act on the blade. Each door is also responsive to wind forces that push it toward the open position and centrifugal forces that pull it toward a closed position. The turbine is designed to balance the three forces acting on the doors so that the centrifugal forces exceed the sum of the wind forces and gravitational forces when the speed of the rotor approaches potentially damaging RPMs. When the rotor slows, the sum of the gravitational and wind forces exceed the centrifugal forces so that the doors move to or toward the open position to again permit the wind to drive the turbine blades. This invention may further have coils in the rotor and on the support column within the rotor for generating electrical power when the rotor turns in the column.

Accordingly, an object of this invention is to provide a vertical axis wind turbine having a mechanical speed control system.

Another object is to provide a wind turbine having electrical power generating means inside the turbine.

The above and other objects and advantages of this invention will be more fully understood by reference to the following description and the drawings attached hereto.

DESCRIPTION OF A PREFERRED EMBODIMENT OF THE INVENTION

Figure 1:
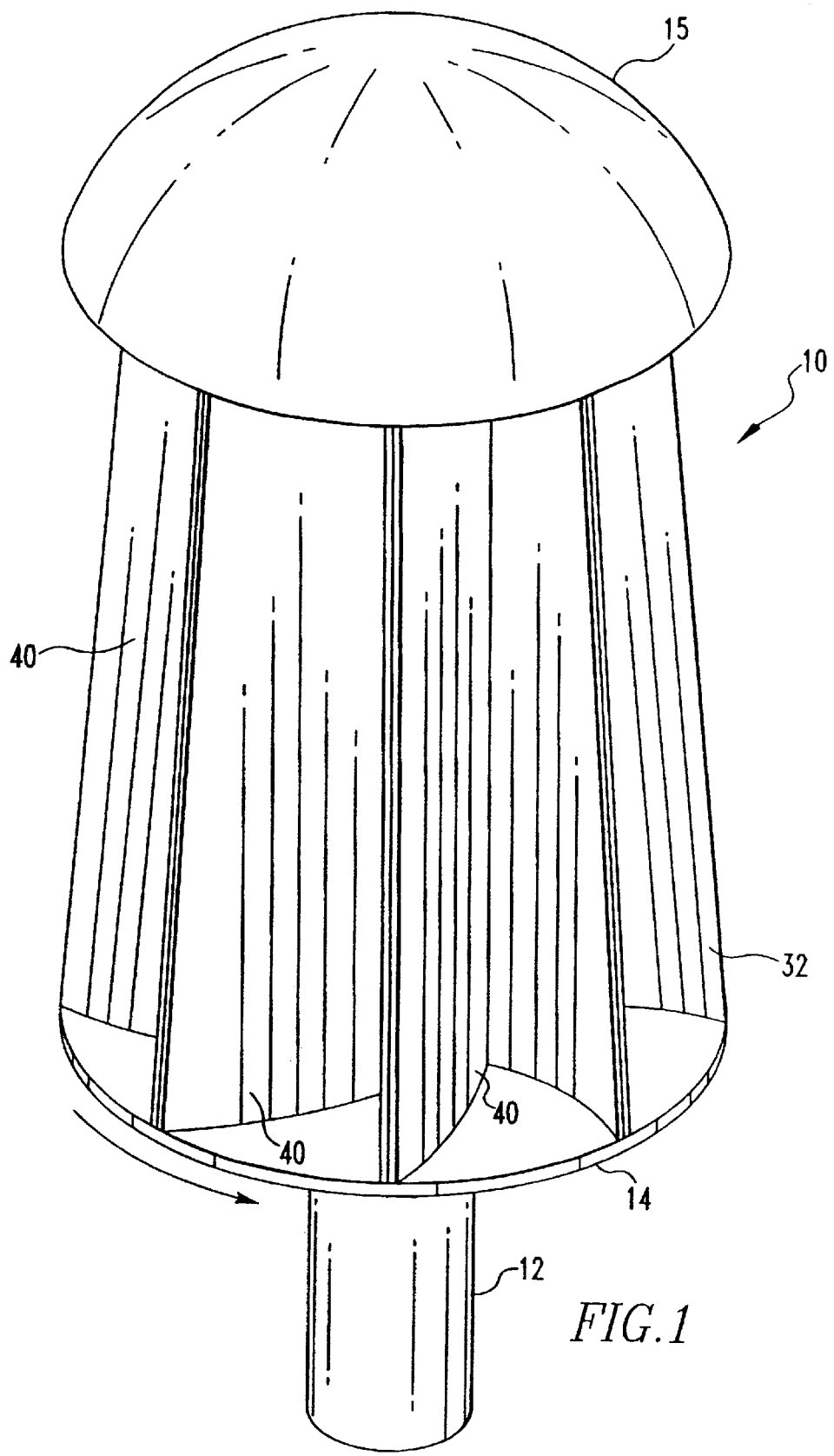
FIG. 1 is a side elevational perspective view of a turbine of this invention.

FIG. 1 shows a preferred embodiment of a wind turbine 10 of this invention as including a support column 12, a rotor 14 on the column, and a cap 15 on the rotor and support column. In the preferred embodiment, the column 12 is stationary or non-rotating, and the rotor 14 rotates or turns on the stationary column. This embodiment includes coils 16 and 18 (FIGS. 2 and 3), for generating electrical power as the rotor 14 turns. As an alternative, the rotor could be fixedly secured to the support column and turn the column, which would drive a separate generator at the base of the column. In the embodiment of FIG. 1, the support column 12 is securely mounted on a base, not shown, to hold the turbine 10 in position. The base can either be on the ground or secured to the top of another structure such as a building or tower.

Figure 2:
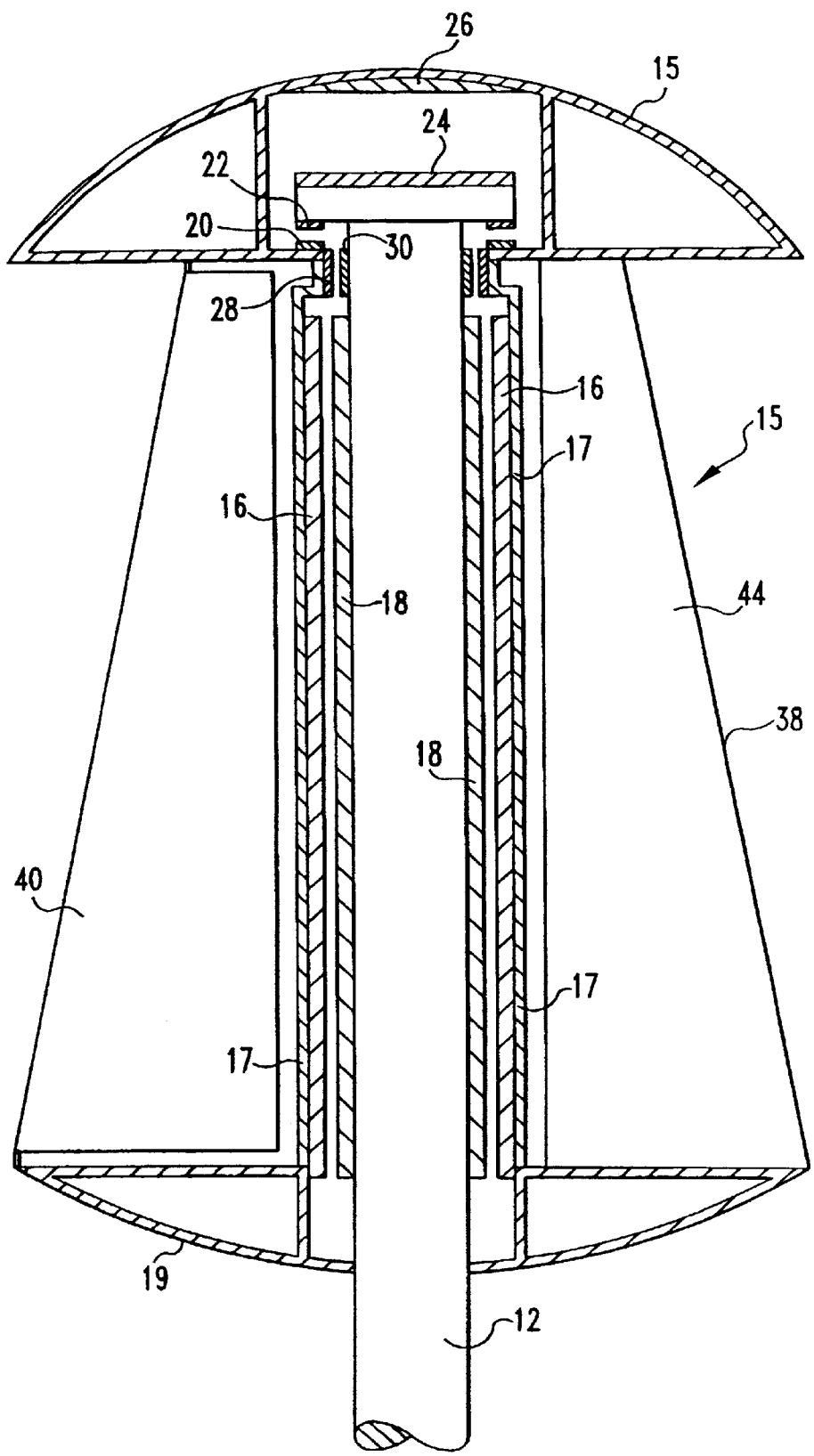
FIG. 2 is a vertical cross-sectional view of a wind turbine of FIG. 1.
Figure 3:
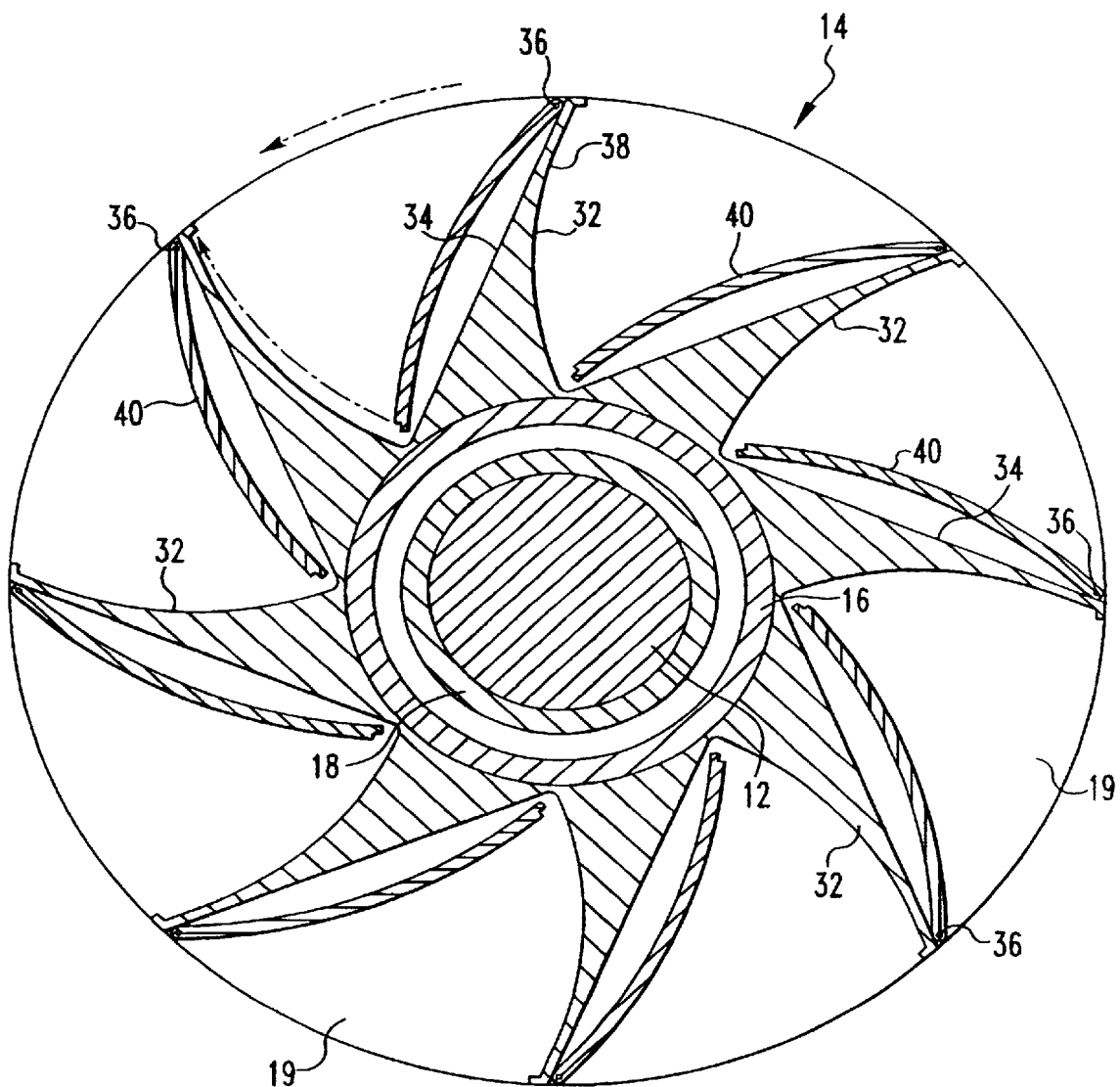
FIG. 3 is a horizontal cross-sectional view through the turbine of FIGS. 1 and 2, taken along line 2—2 of that FIG. 2.

As shown in FIG. 2, the rotor 14 includes an inner cylindrical liner 17, a disc-shaped base 19 with an open center for the column 12, and a top cap 15 that covers the rotor and the central column. The top cap 15 and the base 19 may have air spaces in them or could be filled with vibration dampening material. The base 19 could also be flat instead of convex downwardly. The rotor further has several blades 38 and doors 40 spaced around its periphery as is best seen in FIGS. 1 and 3. The blades 38 are responsive to wind forces on them to rotate the rotor 14 around the stationary column 12. The doors 40 provide an automatic blocking of at least a portion of wind to the blades of the turbine in high winds, as is described below. As is also described below, it is important to this invention that the rotor 14, including the blades 38 and doors 40 on the rotor, has a generally frustoconical shape with a smaller diameter at the top of the rotor than at its bottom, and the doors are hinged at an angle to vertical.

The rotor 14 of the wind turbine 10 is mounted to rotate on the column 12 by upper and lower bearings, not shown. The bearings may be conventional type bearings which support the rotor 14 on the column 12, and permit it to rotate on it with minimal friction. The turbine 10 may also include magnetic stabilizers for helping to stabilize the rotor 14 against vibrations and oscillation that might be caused by the wind or by out-of-balance of the rotor on the column 12. The stabilizers comprise a plurality of opposed magnets 20–22, 24–26, and 28–30 that stabilize the rotor 14 both vertically and horizontally on the column 12 during rotation of the rotor on the column.

As stated above, the turbine 10 preferably includes coils 16, 18 for generating electrical power when the rotor 14 turns on the column 12. Such coils 16, 18 are well known in the art. Coil 16 is on the inside of the rotor 14, and coil 18 is on the stationary support column 12. Electrical wires or cables, not shown, connect the coils 16, 18 to an electrical utility line or to electrical equipment for drawing off the electrical power generated by the turbine.

Turbine 10, including the column 12 and rotor 14, is manufactured from conventional materials such as steel or aluminum sheet or cast materials. The doors 40 can be made of a variety of materials such as metal plate, sheet metal, plastic or the like, to provide sufficient weight for effective balancing of forces as is described below.

Figure 4:
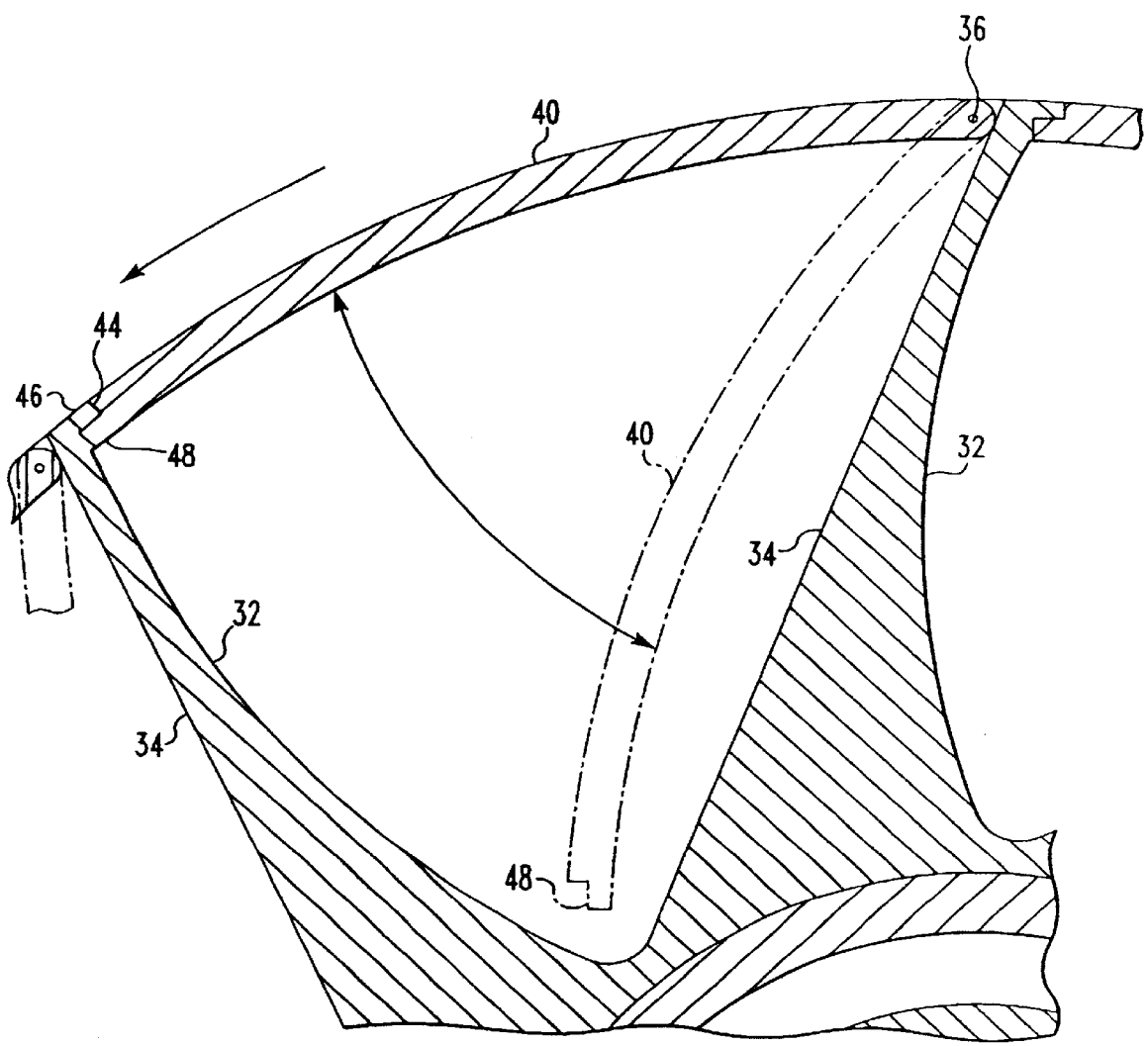
FIG. 4 is an enlarged, fragmentary cross-sectional view similar to FIG. 3, showing a portion of the turbine.

FIGS. 3 and 4 show the blades 38 and doors 40 on the rotor 14 of this invention. The embodiment selected for illustration has eight blades 38 projecting outwardly from the center portion 42 of the rotor 14, but may have any number of blades 38 on it. The blades 38 preferably extend for substantially the full height of the rotor 14 (FIG. 1) and are equally spaced around the rotor. Each blade 38 has a concavely curved windward surface 32 for catching wind energy and a leeward surface 34 on the opposite face of the blade. The blades 38 and doors 40 are wider at the bottom of the rotor than at the top since the rotor has a frustoconical outer diameter and a cylindrical inner liner 17.

Each of the doors 40 is pivotally connected to the rotor at a pivot axis 36 at or near the outer periphery of the rotor 14 for pivoting of the door from an open position (FIG. 3) in which the windward surface 32 of the adjacent blade 38 is exposed to the wind, to a closed position (FIG. 4 and in ghost in FIG. 3) in which the windward surface 32 of the adjacent blade is shielded from, or closed to, the wind. The pivot axis 36 can be in the form of a piano hinge, pivot pin or the like on the outer edge of each of the blades 38. The doors 40 are preferably outwardly convex and have a radius of curvature approximately the same radius as the rotor 14 at the same height on the rotor so the rotor will have a substantially round exterior, in horizontal cross-section when the doors 40 are closed. The radius of curvature of the doors preferably increases from the top to the bottom of the rotor 14 since the rotor tapers outwardly from top to bottom (frustoconical).

The rotor 14 further has a stop 44 for each of the doors 40 to stop the doors from pivoting outwardly any further than the end of the adjacent blades 38. The stop 44 may comprise mating edges 46, 48 on the doors 40 and blades 38 as seen in FIG. 4. The stops 44 may further include rubber, plastic or other resilient material to cushion the impact of a door edge 48 against the blade edge 46 when the door 40 pivots outwardly. Resilient means, not shown, may also be provided to cushion the impact of the doors 40 against the blades 38 when the doors pivot inwardly to the closed position.

It is a feature of this invention that the pivot axis 36 for each of the doors 40 is inclined outwardly with respect to the center of the column toward the bottom of the door as is illustrated in FIGS. 1 and 2. Each pivot axis 36 is also preferably in a plane extending through the center axis of the rotor. Such incline of the pivot axis 36 to vertical produces a gravitation force on the door 40 that pulls the door toward the closed position. The magnitude of such gravitational force depends primarily on the weight of the door 40 and the angle of the incline. The greater the angle of the pivot axis 36 to vertical, the greater the gravitational force will be on the doors 40. The angle of incline is preferably in a range of about 2–10° but may be more or less depending on the weight of the doors 40, diameter of the rotor 14 and the design speed for the turbine, among other factors. The top and bottom edges of the doors may also have a similar small angle to horizontal or may be substantially horizontal as illustrated. In accordance with this invention, the rotor 14 is designed to have a gravitational force sufficient to move the doors 40 to the open position when the winds acting on the turbine 10 are not excessive to the point of possibly causing the turbine 10 to be damaged.

In the operation of a turbine 10, the doors 40 are responsive to wind energy acting on the outer surfaces of the doors to push them toward the open position. The higher the wind speed, the greater the force. The doors 40 are also responsive to centrifugal force produced by rotation of the rotor 14. Such centrifuged forces pull the doors 40 outwardly toward the closed position. The centrifugal forces increase with increases on the rotational speeds (RPM) which result from higher wind speeds. The doors 40 are also responsive to the gravitational forces discussed above that pull the doors toward the open position. The gravitational forces are essentially constant regardless of the speed of the rotation and wind speeds.

Turbines of the invention are designed such that the sum of the wind forces and gravitational forces on the doors 40 exceed the centrifugal forces on the doors when the rotational speed (RPM) of the turbine is safely below a RPM that might damage the turbine (safe RPM), and that the centrifugal forces are greater than the sum of the wind forces and gravitational forces when the turbine speed exceeds the safe RPM. The safe RPM will vary from turbine-to-turbine depending on a number of factors such as materials of construction, bearings, base construction, etc. Balancing of the three above-described forces acting on the doors 40 is also dependent on several factors including size of the doors, weight of the doors, angle of incline of the pivot axis of the doors, diameter of the rotor 14 and loci of the pivot axes around the turbine axis, among others. The balance of forces can be determined mathematically and/or empirically by trial and error to produce the desired opening and closing of the doors in accordance with the invention.

In the operation of a wind turbine 10, the doors 40 may pivot between the closed positions to their open positions or to any position therebetween depending on the rotational speed of the turbine. The doors 40 can therefore act as a governor that maintains the rotational speed at a safe level rather than completely shutting the turbine down. As the speed of the turbine approaches a potentially damaging RPM, the doors 40 can partially close so that the speed does not increase beyond a safe RPM, but may not fully close to shut the wind completely from the turbine blades. The doors will further close or open again as the turbine turns faster or slower. The doors 40 may fully close if the speed of the rotor is excessively high.

Figure 5:
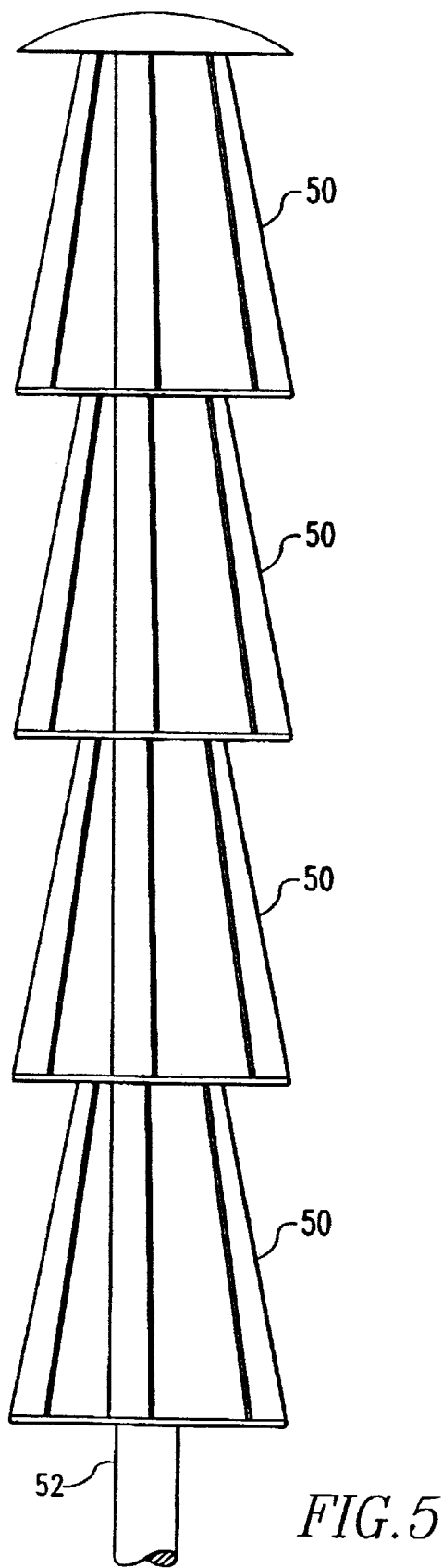
FIG. 5 is a side elevational view of an alternative embodiment of this invention having a plurality of stacked turbines on one support column.

FIG. 5 shows an alternative embodiment of the invention in which a plurality of rotors 50 are mounted one on top of another (stacked) on a rotor 52. The rotors 50 are all substantially the same as the rotor 14 shown in FIGS. 1–4 with a plurality of blades and hinged doors on each rotor. The angle of incline on the outer edges of the rotors 50 is exaggerated in the illustration in FIG. 5. As stated above with respect to FIGS. 1 and 2, the angle of incline is preferably about 2–10° to vertical. The rotors 50 in FIG. 5 are stacked to provide a more consistent outer diameter for the system for a substantial height. If a single rotor were to have the same vertical height as the multiple rotors of FIG. 5, the top of the rotor would have a much smaller outer diameter than does the top rotor 50 in FIG. 5.

It is therefore seen that this invention provides an improved wind turbine that has an automatic governor means to prevent high wind speeds from possibly damaging the turbine. It will be apparent to those skilled in the art that numerous modifications can be made to the preferred embodiment without departing from this invention or the scope of the claims appended hereto.

What is claimed is:

1. A vertical axis wind turbine comprising:

a vertically oriented support column;

a rotor mounted on said column, said rotor including a plurality of blades spaced circumferentially around the rotor; and a plurality of doors hingedly mounted on said rotor around its periphery, with one of said doors between each pair of adjacent blades, each of said doors having a hinge axis located near the outer edge of one of said blades and inclined outwardly toward the bottom of the rotor, whereby the force of gravity pulls each said door to pivot about said hinge axis toward the center of the rotor.

2. A wind turbine as set forth in claim 1 in which the hinge axis for each said door is inclined outwardly at an angle in a range of 2–10° to vertical.

3. A wind turbine as set forth in claim 1 which includes a stop near the outer edge of each blade for stopping one of said doors from hinging outwardly further than said stop.

4. A wind turbine as set forth in claim 1 in which each of said blades has a concave surface for catching the wind to turn said rotor.

5. A wind turbine as set forth in claim 4 in which each of said doors is made of metal plate material.

6. A wind turbine as set forth in claim 1 in which said rotor rotates around a stationary support column and includes a copper coil and magnets for generating electrical power when said rotor rotates.

7. A wind turbine as set forth in claim 1 that includes magnetic stabilizers.

8. A wind turbine as set forth in claim 1 that includes a plurality of rotors stacked on said support column.

9. A wind turbine as set forth in claim 1 in which centrifugal forces produced by rotation of said rotor causes said doors to pivot outwardly opposite to said forces of gravity pulling the doors inwardly and wind forces pushing said doors inwardly.

10. A wind turbine as set forth in claim 9 in which said centrifugal forces exceed the sum of said gravity forces and said wind forces when said rotor speed exceeds a predetermined RPM, and the sum of said gravity forces and wind forces exceed the centrifugal forces when the rotor speed is less than said predetermined RPM.

11. A vertical axis wind turbine comprising:

a vertically oriented support column;

a rotor mounted on said column, said rotor including a plurality of outwardly projecting, substantially vertically extending blades having concave surfaces responsive to wind forces to rotate the rotor about the axis of said column to produce electrical power; and a plurality of doors hingedly mounted on said rotor around the periphery of the rotor, with one of said doors between each pair of adjacent blades, each of said doors hingedly connected to said rotor on a hinge axis located near the outer edge of one of said blades, with said hinge axis inclined outwardly from the support column toward the bottom of the rotor;

whereby each said door is acted on by gravitation forces and wind forces tending to pivot the door toward the center of the rotor and by centrifugal forces tending to pivot said door away form the center of the rotor.

12. A wind turbine as set forth in claim 11 in which said hinge axis is inclined at an angle in the range of 2–10° to vertical so the forces of gravitational and wind exceed the centrifugal forces when the rotor speed is below a predetermined RPM, and the centrifugal forces exceed the sum of gravitational and wind forces when the rotor speed exceeds said predetermined RPM.

13. A wind turbine as set forth in claim 11 which includes a copper coil and magnets.

14. A wind turbine as set forth in claim 11 which includes magnetic stabilizers.

15. A vertical axis wind turbine having a rotor with plurality of blades on it, the improvement comprising a plurality of doors on the rotor with one of said doors associated with each blade and pivotally mounted at an angle to vertical to be pulled outwardly by centrifugal force when the rotor rotates at a predetermined high RPM that could damage the turbine, so the door at least partially blocks wind forces from acting on the associated blade, and is pulled inwardly by the force of gravity when the rotor rotates at a speed less than said predetermined high RPM.

16. A vertical wind turbine as set forth in claim 15 in which said doors are pivotally mounted near the outer periphery of said rotor.

17. A wind turbine as set forth in claim 16 which includes stops to prevent said doors from pivoting outward beyond the outer edges of said blades.

18. A wind turbine as set forth in claim 15 which includes a coil and magnet for generating electrical power when the rotor rotates.

19. A vertical axis wind turbine comprising:

a vertically oriented, non-rotating support column;

a rotor mounted on said column and rotatable on said column, said rotor including a plurality of blades spaced circumferentially around the rotor for receiving wind energy to rotate the rotor on said stationary column; where coils on said rotor and on said column within said rotor for generating electrical power when the rotor rotates on the column; and a plurality of doors pivotally mounted on said rotor near its outer periphery at an inclined angle to vertical to be pulled inwardly by the force of gravity and to be pulled outwardly by centrifugal force when the rotor rotates at a predetermined speed that could damage the turbine so the door at least partially blocks wind forces from acting on at least some said plurality of blades.

* * * * *